United States Patent [19]

Jarrett et al.

[11] 4,238,237

[45] Dec. 9, 1980

[54] MANUFACTURE OF CEMENT BY INTERGRINDING CARBONACEOUS FUEL

[75] Inventors: Robert P. Jarrett, St. John; Stewart W. Tresouthick, Munster, both of Ind.

[73] Assignee: United States Steel Corporation, Pittsburgh, Pa.

[21] Appl. No.: 113,418

[22] Filed: Jan. 18, 1980

[51] Int. Cl.$^3$ ............................................... C04B 7/36
[52] U.S. Cl. .................................................. 106/100
[58] Field of Search ........................................ 106/100

[56] References Cited

U.S. PATENT DOCUMENTS 4,022,629  5/1977  Garrett et al. ...................... 106/100

*Primary Examiner*—James Poer
*Attorney, Agent, or Firm*—W. Gary Goodson

[57] ABSTRACT

The manufacture of Portland cement clinker by (1) forming an intimate mixture by intergrinding (a) unsintered Portland cement raw materials and (b) a low volatile carbonaceous fuel such as coke breeze having a high ignition temperature, (2) passing the intimate mixture through a set of preheating cyclones wherein it is preheated prior to passing into a calcining zone, and (3) passing the mixture into said calcining zone wherein said intimate mixture (a) is maintained in a substantial fluidized condition, and (b) is heated rapidly up to a calcination temperature to accomplish calcination of the Portland cement raw material and the ignition of the carbonaceous fuel.

14 Claims, 1 Drawing Figure

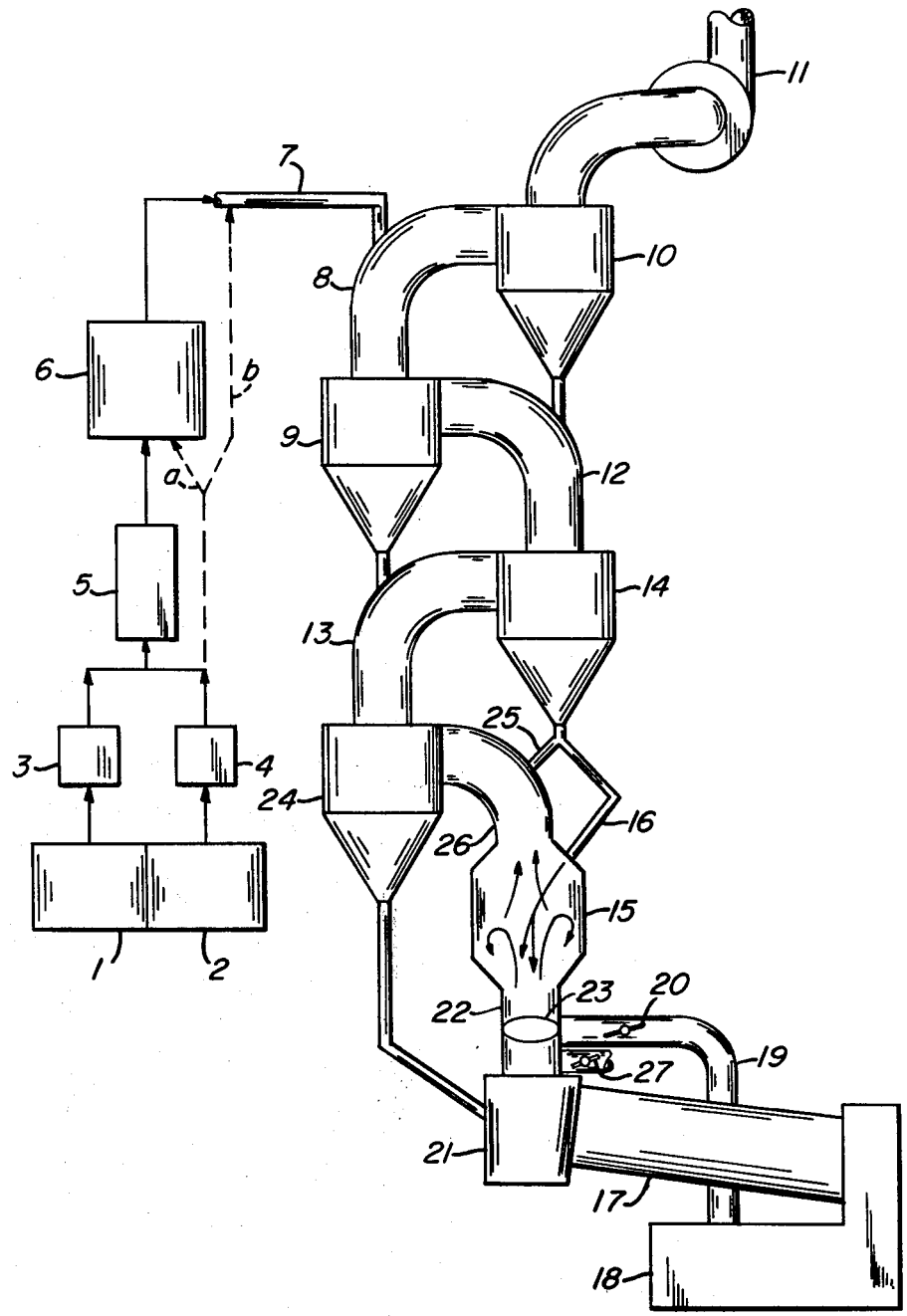

4,238,237

MANUFACTURE OF CEMENT BY INTERGRINDING CARBONACEOUS FUEL

BACKGROUND OF THE INVENTION

1. Field of the Invention

This invention relates to the manufacture of Portland cement clinker by calcining prior to the traditional rotary kiln.

2. Description of the Prior Art

In the manufacture of Portland cement clinker it is well known to practice calcination prior to clinkering in the rotary kiln. Energy to provide the heat in the calcining step is supplied by burners or feeders supplying fuel directly to the calcining vessel. These external fuel burners and fuel feeders are a source of mechanical and processing problems that lead to the instability of the system. Furthermore, the burners or fuel feeders, their storage, pumping and transport systems are expensive to build and maintain. Additionally, many of the lower cost waste fuels are not suitable for use because of flow, ignition and other like problems.

Garrett et al, U.S. Pat. No. 4,022,629, incorporated herein by reference discloses a method of manufacturing cement clinker wherein carbonaceous material is added to the cement raw material to provide a source of heat in the calcination stage. However, the calcination stage in Garrett et al is in the rotary kiln. Therefore, when using certain low-grade carbonaceous fuels, there are still serious combustion problems and lack of uniformity of heating in the calcination zone. While it is mentioned at column 6 of Garrett et al that the fuel may be added during the grinding operation, there is no recognition of any particular advantage in this. Furthermore, the indicated manner of introducing the fuel when preheater cyclones are employed is between the lower cyclones or between the lowest cyclone and the rotary kiln. This would result in the aforementioned problems inherent in fuel burners and fuel feeders.

SUMMARY OF THE INVENTION

This invention relates to a continuous method of manufacturing Portland cement clinker comprising (1) forming an intimate mixture by intergrinding (a) unsintered Portland cement raw materials and (b) a low volatile carbonaceous fuel, such as coke breeze, having a high ignition temperature, (2) passing the intimate mixture through a set of preheating cyclones wherein said intimate mixture is preheated prior to passing into a calcining zone, and (3) passing the preheated intimate mixture into the calcining zone wherein said intimate mixture (a) is maintained in a substantial fluidized condition, and (b) is heated rapidly up to a calcination temperature of between about 1000° and about 2000° F. to accomplish in the calcining zone the calcination of said Portland cement raw material and ignition of the carbonaceous fuel, such that the heating in the calcining zone is effected at least in part by combustion of the carbonaceous fuel within said calcining zone, the calcination temperature being below the temperature of insipient fusion of the Portland cement raw materials to effect thermal decomposition of calcium carbonate with evolution of carbon dioxide. Preferably, the calcined Portland cement raw materials are then introduced into an inclined rotary vessel comprising a clinkering zone wherein the Portland cement raw materials are heated at sintering temperatures generally ranging between about 2300° to about 2900° F., the sintering temperature being at or above the insipient fusion temperature of said Portland cement raw materials to effect clinkering.

Preferably the intimate mixture after intergrinding has a particle size of less than about 300 micrometers.

This invention eliminates the problems of fuel feeders and fuel burners. Additionally, the heating of the Portland cement raw materials in the calcination step takes place very efficiently and uniformly, thus adding to the stability of the process. Additionally, it is now possible to very easily use low grade carbonaceous fuel without adversely affecting the cement manufacturing process.

BRIEF DESCRIPTION OF THE DRAWING

This invention will be better understood and its numerous objects and advantages will become apparent to those skilled in the art by reference to the accompanying drawing as follows:

FIG. 1 is a schematic representation of the cement manufacturing apparatus and methods of this invention.

DESCRIPTION OF THE PREFERRED EMBODIMENTS

The carbonaceous fuel of this invention has a low volatiles content and a high ignition temperature of these materials so that combustion of this fuel occurs primarily in the calcining zone. Finely divided coke is a preferred material. Coal or petroleum coke may be utilized. Coke breeze, and especially that having a particle size of less than about 3/16 inch, is a preferred material.

The carbonaceous fuel is used in the practice of this invention to provide between about 5 and about 75%, desirably between about 5 and about 60°, and preferably between about 30 and about 50% of the total heat required for the process. It generally has a volatiles content of not more than about 40%, desirably not more than 20% and preferably not more than about 10%. Volatiles content as employed herein refers to the percent of the fuel which is volatilized at about 1000° F., calculated on a moisture and ash-free basis. The carbonaceous fuel employed in the practice of this invention will have an ash content of less than about 30% and preferably less than about 10%. Since substantial ignition of the fuel in the precalcining zone must be carefully controlled to preclude undesirable effects on thermal efficiency, the non-volatile portion of the residual fuels will have an ignition temperature of less than about 1500° F., desirably between about 750° and about 1500° F., and preferably between about 1000° and about 1500° F.

In the intergrinding step it is important that the carbonaceous fuel and Portland cement raw materials be intimately mixed such that the carbonaceous fuel is readily combusted under the conditions in the calcining zone. A particle size of less than about 300 micrometers has been found to be especially preferred due to the ease of combustion and good heat transfer to the Portland cement raw materials.

The carbonaceous fuel is preferably added to the Portland cement raw materials in an amount of up to about 5 percent, and preferably between about 0.4 percent and about 4.7 percent, by weight of the total mixture. At these rates the carbonaceous fuel will provide up to about 60 percent of the heat used in the calcination zone, and preferably between about 5 percent and about 60 percent. These figures will obviously vary depending upon the nature of the carbonaceous fuel, the other types of heating, etc.

Raw materials for the manufacture of Portland cement are well known and will not be described in detail here. Generally, however, a calcareous material is employed in conjunction with materials that provide $SiO_2$, and $Al_2O_3$. Most often, materials that provide $Fe_2O_3$ also are employed. It will be understood that one additive may supply more than one of the raw material ingredients. For example, a clay may supply both $SiO_2$ and $Al_2O_3$.

Typical Portland cement raw material mixes may contain between about 70% and about 80% $CaCO_3$, between about 12 and about 20% $SiO_2$, between about 3 and about 7% $Al_2O_3$, and between about 2 and about 5% $Fe_2O_3$. The raw material mix can, of course, contain other minerals as well and, indeed, many mixes will contain up to about 4% MgO. While the above ingredients and proportions are typical, mixes can vary in proportions and/or ingredients. The raw materials generally are finely powdered and are blended either in the dry state or in aqueous slurries to provide a homogeneous mix.

The invention may be more readily understood by reference to FIG. 1 which is a schematic flow sheet of the cement manufacturing process of this invention. The invention will first be described with respect to a dry process and thereafter be described with regard to a wet process.

Coke breeze, used as an example throughout this description, has an ignition temperature of about 1300° F., depending on fineness, analysis and ambient conditions. The coke breeze is interground with the Portland cement materials which are passed through a four-stage cyclonic preheater of known type counter currently to hot gases emanating from the rotary kiln. The coke breeze and Portland cement materials temperature is raised to about 1300° F. in the calcination zone, and if oxygen is present, the coke breeze will ignite, combusting and producing extra heat to further the calcination of the Portland cement raw materials. The Portland cement raw materials are composed of a large proportion of ground limestone ($CaCO_3$) which must be dissociated to CaO and $CO_2$ before the Portland cement clinker reactions can take place. Traditionally this is done in the rotary kiln which is a very poor, inefficient heat exchanger. Thus, it is to be desired to calcine the $CaCO_3$ by an efficient method and means to save fuel. Burning fuel in a violently agitated or fluidized bed or stream of material is much more efficient than in the relatively quiescent bed of the rotary kiln. The means of accomplishing this in the present invention will be apparent in the following description.

Portland cement raw materials from hopper 1 and low volatile carbonaceous fuel such as coke breeze from hopper 2 are fed into weigh feeders 3 and 4 respectively to accurately proportion the materials on a weight basis. The feeders convey and proportion said materials to a grinding mill 5 to reduce the Portland cement raw materials to the required sizing necessary for the cement making process. The mill 5 intergrinds the Portland cement raw materials and the carbonaceous fuel, the product thus produced being conveyed to a blending, homogenizing or mixing vessel 6. The blended material is then conveyed to a flash calcining preheater kiln operation.

Feed is introduced into the top of the preheater through pipe 7 into riser duct 8. The upcoming gases from cyclone 9 carry the powdered material to cyclone 10 where the gases separate from the powdered material and pass to the induced draft fan 11 which is the prime means for moving the gases throughout the entire preheater system. In a like manner, the powdered material drops from cyclone 10 to riser duct 12 and passes to cyclone 9, etc.

The powdered material drops out of cyclone 14 to the flash calcining vessel 15 through feed pipe 16. The ignition temperature of the low volatile carbonaceous fuel is higher than any temperature reached in the ducts and cyclones 9, 10 and 14. To support combustion of this carbonaceous fuel, ignition temperature must be attained and also oxygen must be supplied. In one embodiment of this invention, oxygen is supplied through the rotary kiln 17, but in the preferred embodiment, oxygen is supplied by means of transporting heated waste air taken from clinker cooler 18 through duct 19, the quantity of this air, and therefore oxygen, being controlled by dampers 20. Calcining vessel 15 is communicated with the kiln 17 by the kiln backhousing 21 and mixing duct 22. Duct 19 is connected to mixing duct 22 by means of a tangential inlet 23 which causes the gases to swirl in mixing duct 22 so that the hotter gases coming from the kiln 17 are about 1800° to 2200° F. and are contained within the interior of the vortex, thus producing a relatively cooler layer of gases next to the wall of the mixing duct 22, thus obviating the build-up of molten material on the wall of the duct 22. The diameter of the mixing duct 22 and the diameter of the calcining vessel 15 are carefully chosen to produce gas velocities in the two that result in a material flow pattern in the calcining vessel 15 known as a spouted bed. FIG. 1 shows the pattern of material movement in the calcining vessel 15. This causes a violent and intimate mixture of hot oxygenated air and the carbonaceous fuel which leads to immediate, almost flameless combustion of the fuel within the feed of Portland cement raw materials. Thus, the intimate juxtaposition of the combusting coke breeze, or the like, to the particles of Portland cement raw materials which in turn is raised to a temperature of about 1600° to 1700° F. having entered the calcination vessel 15 at about 1250° to 1350° F. The intimate mixing, agitation, and small particle size of the Portland cement raw materials assures 90 to 95% calcination of the Portland cement raw materials in the very short period of residence time within the vessel. This also assures that the off-gas of the calcination step will not greatly exceed the temperature of the Portland cement raw materials. Thus, gas exiting cyclone 24 will be about 1750° to 1850° F. This helps prevent plugging the passages of the preheater with molten material.

It may be necessary to vary the amount of low volatile carbonaceous fuel more rapidly than means cited above for control purposes. Then, using feeder 4, the coke breeze, or the like is conveyed to homogenizer 6 without going through the grinding mill 5 (path a), or for even faster change, path b leading directly into the feed means to the preheater may be used. For the most intimate mixture, the intergrinding of all materials as originally cited is preferred.

The system can also be run as a regular 4-stage preheater by omitting the low volatile carbonaceous fuel, using the bypass 25, and closing damper 20. Further, the system can be operated in a modified precalciner mode by intergrinding the low volatile carbonaceous fuel as cited above but without using the precalcining vessel 15. In this mode, the bypass 25 is used, the damper 20 is closed, and the kiln is operated in such a way as to provide excess oxygen in the exit gases at 21 and 22 so as to combust the coke breeze or the like in the riser duct 26 going to cyclone 24. While only a small amount of combustion can be maintained in this mode as compared to using the calcination vessel 15, nevertheless, some additional calcination over the regular 4-stage preheater operation is realized.

An alkali bypass 27 can be used to control alkali and chloride levels in the kiln preheater system and the clinker.

We claim:

1. A continuous method of manufacturing Portland cement clinker comprising:
   (1) forming an intimate mixture by intergrinding (a) unsintered Portland cement raw materials and (b) a low volatile carbonaceous fuel having a high ignition temperature,
   (2) passing said intimate mixture through a set of preheating cyclones wherein said intimate mixture is preheated prior to passing into a calcining zone, and
   (3) passing said preheated intimate mixture into said calcining zone wherein said intimate mixture (a) is maintained in a substantial fluidized condition, and (b) is heated rapidly up to a calcination temperature of from about 1000° to about 2000° F. to accomplish calcination of said Portland cement material in said calcining zone and to accomplish the ignition of said carbonaceous fuel such that the heating in said calcining zone is effected at least in part by combustion of said carbonaceous fuel within said calcining zone, said calcination temperature being below the temperature of insipient fusion of said Portland cement raw materials to effect thermal decomposition of calcium carbonate with evolution of carbon dioxide.

2. Method as in claim 1 wherein the calcined Portland cement raw materials are introduced from said calcining zone into an inclined rotary vessel comprising a clinkering zone wherein said Portland cement raw materials are heated at sintering temperatures generally ranging from about 2300° to about 2900° F., said sintering temperature being at or above the insipient fusion temperature of said Portland cement raw materials to effect clinkering.

3. Method as in claim 2 wherein said set of preheating cyclones are in the form of a four-stage cyclonic preheater, and wherein said intimate mixture from said intergrinding step is passed countercurrently into a stream of hot gases emanating from said rotary kiln to the first stage, then on through the other stages of said calcining zone, and finally to said rotary kiln.

4. Method as in claim 3 wherein said carbonaceous fuel is coke and wherein calcination takes place in a separate calcination vessel between said set of cyclones and said rotary kiln.

5. Method as in claim 4 wherein said coke is coke breeze.

6. Method as in claim 4 wherein the particle size of the Portland cement raw materials and carbonaceous fuel after intergrinding is less than about 300 micrometers.

7. Method as in claim 3 wherein said carbonaceous fuel has an ignition temperature of between about 1000° and about 1500° F.

8. In a continuous method for the manufacture of Portland cement clinker comprising:
   (1) introducing unsintered Portland cement raw materials comprising calcium carbonate containing material, silica containing material, alumina containing material and iron containing material into a four-stage cyclonic preheater where said materials are preheated;
   (2) heating the preheated Portland cement raw materials in a calcining zone under conditions of agitation and in a substantial fluidized condition due to a countercurrent stream of hot gases from an attached rotary kiln said calcining zone being at calcination temperatures generally ranging between about 1000° F. and about 2000° F., said calcination temperatures being below the temperature of insipient fusion of said cement materials to effect thermal decomposition of calcium carbonate with evolution of carbon dioxide;
   (3) continuously transferring calcined material from said calcining zone to a rotary kiln including a clinkering zone; and
   (4) heating said calcined material in said clinkering zone at sintering temperatures generally ranging between about 2300° and about 2900° F., said sintering temperatures being at or above the temperature of insipient fusion of said Portland cement materials to effect clinkering; the improvement comprising intimately mixing into said Portland cement raw materials by intergrinding prior to the preheating step a finely divided, solid carbonaceous fuel having a volatiles content not more than about 40%, the ignition temperature of the non-volatile portion being greater than the temperature reached prior to said calcining zone and less than about 1500° F.; said carbonaceous fuel having an ash content of less than about 30% to provide at least 5% of the heat required for said process in said calcination zone, said volatiles content and said non-volatiles ignition temperature of said carbonaceous fuel being such that oxidation of said carbonaceous fuel occurs primarily in said calcination zone.

9. Method as in claim 8 wherein said carbonaceous fuel is petroleum coke or coal coke.

10. Method as in claim 8 wherein said carbonaceous fuel is coke breeze having a particle size of less than about 3/16 inch prior to the intergrinding step.

11. Method as in claim 10 wherein said coke breeze has an ignition temperature of between about 1000° and about 1500° F.

12. Method as in claim 8 wherein between about 5 and about 60 percent of the heat required in said calcination zone is provided by combustion of said carbonaceous fuel.

13. Method as in claim 12 wherein between about 30 and about 50 percent of the heat required in said calcination zone is provided by combustion of said carbonaceous fuel.

14. Method as in claim 8 wherein the intimate mixture of said Portland cement raw materials and said carbonaceous fuel after the intergrinding step has a particle size of less than about 300 micrometers.

* * * * *